United States Patent [19]
Walker

[11] Patent Number: 6,092,838
[45] Date of Patent: Jul. 25, 2000

[54] SYSTEM AND METHOD FOR DETERMINING THE WEIGHT OF A PERSON IN A SEAT IN A VEHICLE

[76] Inventor: Robert R. Walker, 10115 Orangewood Ave., Garden Grove, Calif. 92640

[21] Appl. No.: 09/055,809

[22] Filed: Apr. 6, 1998

[51] Int. Cl.[7] .................................................. B60R 21/32
[52] U.S. Cl. ..................... 280/735; 280/271; 280/273; 177/136; 73/862.474; 73/862.627; 297/452.55
[58] Field of Search .......................... 280/735; 180/273, 180/271; 177/136, 144, 45; 73/862.474, 862.473, 862.627; 297/452.18, 452.22, 452.55

[56] References Cited

U.S. PATENT DOCUMENTS

| | | | |
|---|---|---|---|
| 1,860,381 | 5/1932 | Cable | 297/425.55 |
| 4,010,811 | 3/1977 | Muccillo, Jr. | 177/257 |
| 4,050,532 | 9/1977 | Provi et al. | 177/211 |
| 4,361,741 | 11/1982 | Leskoverc et al. | 200/85 A |
| 4,385,863 | 5/1983 | Minor | 414/699 |
| 4,521,658 | 6/1985 | Wyland et al. | 219/708 |
| 4,953,244 | 9/1990 | Koerber, Sr. et al. | 5/600 |
| 5,071,160 | 12/1991 | White et al. | 21/32 |
| 5,327,791 | 7/1994 | Walker | 73/862.628 |
| 5,413,378 | 5/1995 | Steffens, Jr. et al. | 21/28 |
| 5,454,591 | 10/1995 | Mazure et al. | 21/32 |
| 5,474,327 | 12/1995 | Schousek | 21/32 |
| 5,494,311 | 2/1996 | Blackburn et al. | 280/735 |
| 5,501,509 | 3/1996 | Urrutia | 297/452.18 |
| 5,573,269 | 11/1996 | Gentry et al. | 280/735 |
| 5,636,901 | 6/1997 | Grilliot et al. | 297/452.18 |

*Primary Examiner*—Brian L. Johnson
*Assistant Examiner*—Deanna Draper
*Attorney, Agent, or Firm*—Michael H. Jester

[57] ABSTRACT

A system for detecting the weight of a person seated in a vehicle seat includes a pair of load sensor beams. Each load sensor beam has an intermediate section extending between a pair of opposite end sections. The opposite end sections of the load sensor beams are connected to a base frame of the vehicle seat. The load sensor beams are also connected to a seat pan of the vehicle seat that is positioned adjacent the base frame. The end sections of the load sensor beams are connected to opposite sides of the seat pan so that a plurality of loads generated by the weight of a person sitting on a seat cushion carried by the seat pan are transmitted to the intermediate sections of the load sensor beams. At least one sensor is mounted on the intermediate section of each load sensor beam for outputting signals representative of the plurality of loads generated by the weight of the person sitting on the seat cushion.

30 Claims, 5 Drawing Sheets

SYSTEM AND METHOD FOR DETERMINING THE WEIGHT OF A PERSON IN A SEAT IN A VEHICLE

CROSS-REFERENCE TO DISCLOSURE DOCUMENT

The present invention is described and illustrated in a Disclosure Document No. 424,665 entitled "Automobile Passenger Seat Weight Detection System" filed in the United States Patent and Trademark Office on Aug. 29, 1997.

BACKGROUND OF THE INVENTION

1. Field of the Invention

The present invention relates to weighing systems, and more particularly, to a system for detecting the weight of a person seated in a vehicle seat in order to determine whether to disable an inflatable safety air bag.

2. Description of the Related Art

Air bags are an important safety device included in modern motor vehicles. However, there have been injuries associated with the actuation of air bags located in front of the front passenger seat of vehicles. The occupant of the front passenger seat may be injured by the air bag if the occupant is a baby or child in a child seat, a small child, a very large adult, or a child or adult seated too close to the air bag on the front portion of the seat. Previous attempts to prevent actuation of air bags under unfavorable circumstances are known in the art. For example, U.S. Pat. No. 5,454,591 of Mazur et al., discloses a system that is intended to prevent actuation of the front passenger seat air bag if a rear-facing child seat is sensed in the front passenger seat. That system disables actuation of the air bag when, in combination, a weight sensor senses an object on the seat weighing less than a predetermined amount, a distance sensor senses a distance to an object on the seat less than a predetermined distance, and a seat belt payout sensor senses a payout greater than a predetermined amount. U.S. Pat. No. 5,474,327 of Schousek also discloses a system that is intended to prevent actuation of the front passenger seat air bag if a rear-facing child seat is sensed in that seat. That system disables actuation of the air bag when eight variable resistance pressure sensors located on a seat cushion sense an occupant weight that is less than a minimum weight, and a weight center that is forward of a reference line.

In some cases air bags can have two different deployment stages, a first stage and a second stage. Activation of the first stage, which is larger than the second stage, is dependent upon the sensed weight of the passenger.

Incorrect air bag actuation decisions by prior devices have often been the result of inaccuracies in determining the weight of the passenger, and inaccuracies in determining the location of the passenger on the seat. Variable resistance pressure sensors and other types of sensors previously utilized to determine the weight and location of a passenger suffer from inherent imprecision. Also, using pressure sensors located in, or abutting, the seat cushion also limits the accuracy of the system.

SUMMARY OF THE INVENTION

It is therefore a primary object of the present invention to provide an improved system and method for detecting and determining the weight of a person seated in a vehicle seat.

It is another object of the present invention to provide a system and method for detecting the weight of a person seated in a vehicle seat with increased accuracy.

It is another object of the present invention to provide an improved system and method for determining when a person seated in a vehicle seat is seated forward of a reference line.

The present invention provides a system and method for detecting the weight of a person seated in a vehicle seat. The system includes a pair of load sensor beams, with each load sensor beam having an intermediate section extending between a pair of opposite end sections. The load sensor beams are connected to a seat pan of the vehicle seat that is positioned adjacent a base frame of the seat. The end sections of the load sensor beams are connected to opposite sides of the seat pan so that a plurality of loads generated by the weight of a person sitting on a seat cushion carried by the seat pan are transmitted to the intermediate sections of the load sensor beams. At least one sensor is mounted on the intermediate section of each load sensor beam for outputting signals representative of the plurality of loads generated by the weight of the person sitting on the seat cushion.

DETAILED DESCRIPTION OF THE PREFERRED EMBODIMENTS

The entire disclosures of U.S. Pat. No. 5,327,791, issued on Jul. 12, 1994 for my invention entitled "Vehicle Beam Load Measuring System," and U.S. patent application Ser. No. 08/847,288, filed on Apr. 24, 1997 for my invention entitled "Vehicle Beam Load Measuring System With Sensor Beam Secured For Increased Accuracy And Zero Cross-Over Detection," are hereby incorporated by reference.

Figure 1A:
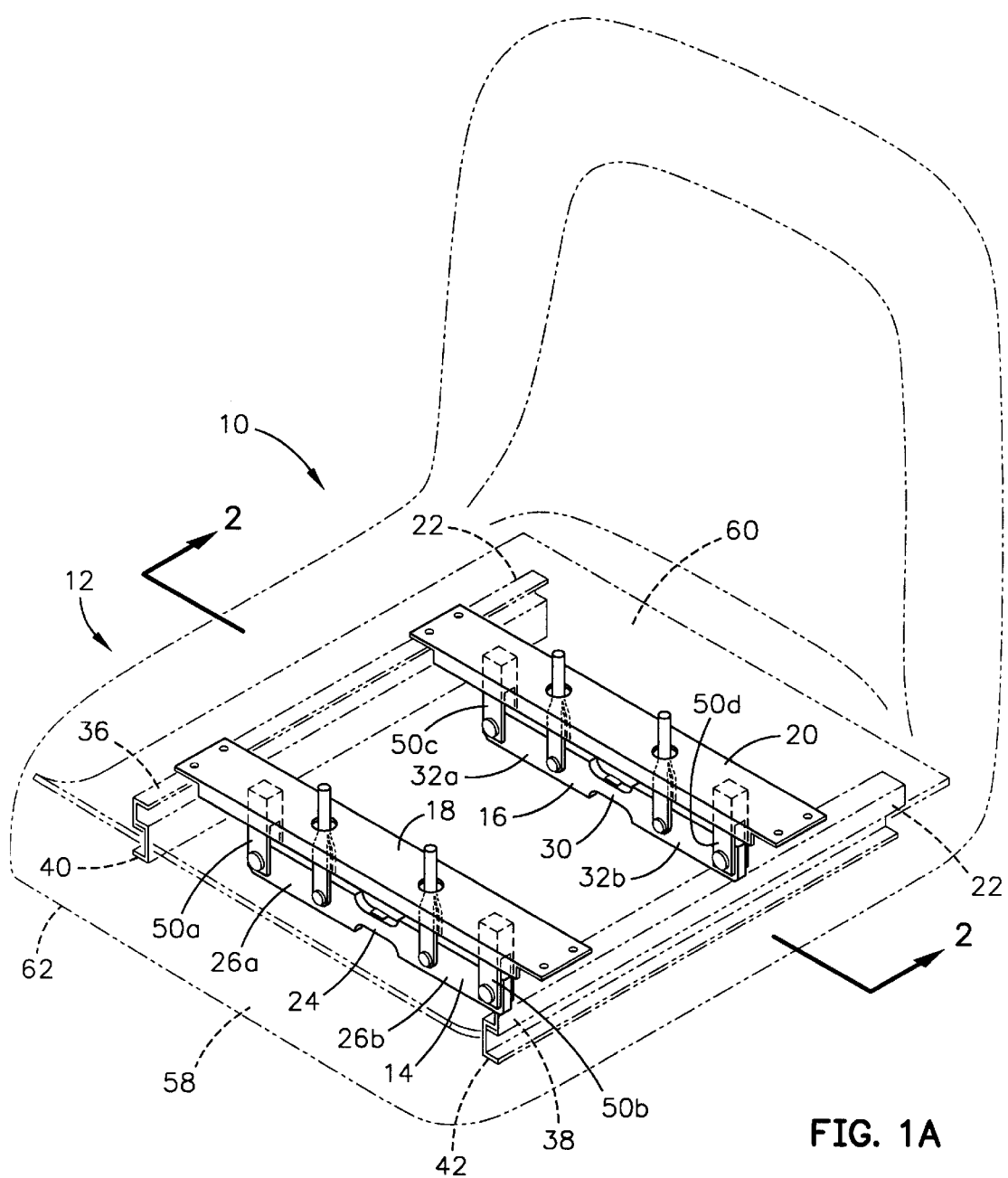
FIG. 1A is an isometric view of a vehicle seat shown in phantom lines equipped with the preferred embodiment of the weight detection system of the present invention shown in solid lines.
Figure 2:
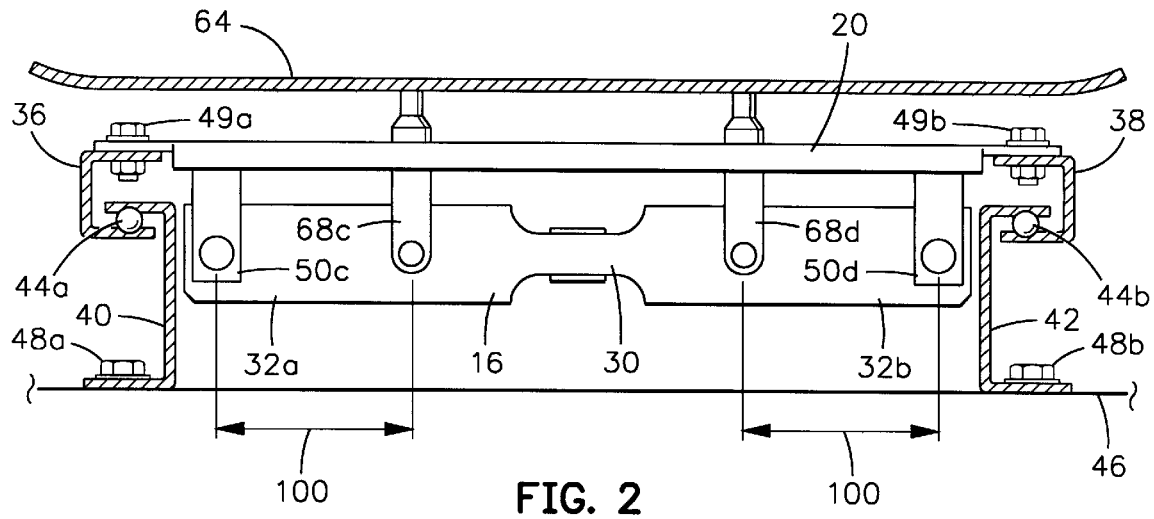
FIG. 2 is an enlarged cross sectional view seen along line 2—2 in FIG. 1A, illustrating the connection of one of the load sensor beams to the base frame and seat pan of the seat.

FIG. 1A illustrates the preferred embodiment of a system 10 for detecting the weight of a person (not shown) seated in a vehicle seat 12. The person whose weight is to be determined can be an adult seated in the vehicle seat 12, or a baby or child seated in a child seat placed on the vehicle seat 12. When a child seat is placed on the vehicle seat, the weight detected is the weight of the baby or child seated in the child seat, plus the weight of the child seat. As illustrated in FIGS. 1A and 2, the system 10 includes a first load sensor beam 14, a second load sensor beam 16, a first cross-member 18, a second cross-member 20, and a base frame 22. The first load sensor beam 14 has an intermediate section 24 extending between a pair of opposite end sections 26a,b. The second load sensor beam 16 also has an intermediate section 30 extending between a pair of opposite end sections 32a,b. The intermediate section 24 of the first load sensor beam 14 has a first cross-sectional area that is less than a second cross-sectional area of the opposite end sections 26a,b. Similarly, the intermediate section 30 of the second load sensor beam 16 has a first cross-sectional area that is less than a second cross-sectional area of the opposite end sections 32a,b. Preferably, although not required, the first cross-sectional area of the intermediate section 24 of the first load sensor beam 14 is equal to the first cross-sectional area of the intermediate section 30 of the second load sensor beam 16, and the second cross-sectional area of the opposite end sections 26a,b of the first load sensor beam 14 is equal to the second cross-sectional area of the opposite end sections 32a,b of the second load sensor beam 16.

Each load sensor beam 14, 16 is formed of a generally planar piece of metal, preferably aircraft aluminum, for example aluminum alloy 2024-T851. As an alternative to aluminum, the load sensor beams 14, 16 may be made of steel, which may provide economic advantages in production quantities. The load sensor beams 14, 16 could also be made of other materials, for example other metals and alloys commonly used in the aerospace industry. Preferably, the load sensor beams 14, 16 and other components of the seat 12 must be able to withstand a force in newtons equal to twenty times the mass of the seat 12 in kilograms multiplied by nine-point-eight (9.8), applied in a forward or rearward longitudinal direction, which is required by federal motor vehicle safety standards established by the National Highway Safety Transportation Board ("NHSTB").

The base frame 22 includes a pair of side rails 36, 38, a pair of tracks 40, 42, and a pair of rail bars 44a,b. The first side rail 36 and the second side rail 38 are positioned spaced apart beneath the seat 12 near each lateral side edge of the seat 12. The first side rail 36 is interlaced and slidingly connected to the first track 40, and the second side rail 38 is interlaced and slidingly connected to the second track 42. The longitudinal axes of the side rails 36, 38 and the tracks 40, 42 are oriented fore to aft in the vehicle, which is referred to as the longitudinal direction. The first side rail 36 is slidingly connected to the first track 40 with the first rail bar 44a, and the second side rail 38 is slidingly connected to the second track 42 with the second rail bar 44b (FIG. 2). The rail bars 44a,b allow the fore to aft position of the seat 12 to be adjusted. Stops (not shown) are provided on the base frame 22 for engaging the first side rail 36 in a fixed position relative to the first track 40, and for engaging the second side rail 38 in a fixed position relative to the second track 42, to prevent movement of the seat 12 after the position of the seat 12 has been adjusted. The tracks 40, 42 are secured to the floor 46 (FIG. 2) of the vehicle (not shown), with bolts 48a,b. Alternatively, the base frame 22 could consist of the side rails 36, 38 without the tracks 40, 42, in which case the side rails 36, 38 would be bolted to the floor 46 and the forward-aft position of the seat 12 would not be adjustable. Alternatively, other base frames for seats 12 known in the art could be used.

The cross-members 18, 20 extend above the load sensor beams 14, 16 in a transverse direction, which is substantially perpendicular to the longitudinal orientation of the side rails 36, 38. The cross-members 18, 20 provide transverse support to the side rails 36, 38, and are used to connect the load sensor beams 14, 16 with the side rails 36, 38. One end of each cross-member 18, 20 is attached to the first side rail 36, and the opposite end of each cross-member 18, 20 is attached to the second side rail 38. In the embodiment illustrated in FIG. 2, nuts and bolts 49a,b are used to fasten the cross-member 20 to the first side rail 36 and the second side rail 38. However, any fasteners could be used to attach the cross-members 18, 20 to the side rails 36, 38, for example rivets, screws, or cotter pins, or, the cross-members 18, 20 could be directly bonded to the side rails 36, 38, for example by welding. A first pin 50a and a second pin 50b, connect the first load sensor beam 14 with the first cross-member 18, and a third pin 50c and a fourth pin 50d connect the second load sensor beam 16 with the second cross-member 20. One end of each of the pins 50a–d is attached to a corresponding end section 26a,b, 32a,b of the load sensor beams 14, 16. The other ends of the pins 50a–d are attached to the cross-members 18, 20, such that two of the pins 50a–d suspend each load sensor beam 14, 16 below, and substantially parallel to, a corresponding one of the cross-members 18, 20. The pins 50a,b attached to the first load sensor beam 14 may be separated from each other from about two hundred fifty (250) millimeters to about three hundred (300) millimeters, and are preferably separated about two hundred seventy-nine (279) millimeters. The same separation distances apply to pins 50c,d attached to the second load sensor beam 16. The cross-members 18, 20 are positioned so that the load sensor beams 14, 16 are spaced apart from each other and extend substantially parallel to each other in the transverse direction. The load sensor beams 14, 16 may be separated from about two hundred twenty (220) millimeters to about three hundred twenty (320) millimeters, and are preferably separated by at least two hundred eighty (280) millimeters. The first load sensor beam 14, also referred to as the forward load sensor beam, is positioned on a forward side 58 of the base frame 22, aid the second load sensor beam 16, referred Lo as the aft load sensor beam, is positioned on a rearward side 60 of the base frame 22.

The preferred embodiment illustrated in FIG. 1A uses two load sensor beams 14, 16, although more than two load sensor beams could be used. For example, more than one load sensor beam could be located beneath each cross-member 18, 20. Also additional cross-member 18, 20 and load sensor beam 14, 16 combinations could be added. In another alternative embodiment the load sensor beams 14, 16 could be oriented substantially parallel to the forward-aft longitudinal orientation of the side rails 36, 38, by connecting end sections 26a, 32a of the load sensor beams 14, 16 to the first cross-member 18, and by connecting end sections 26b, 32b to the second cross-member 20. The alternative longitudinal orientation of the load sensor beams 14, 16 could also be accomplished by connecting both end sections 26a,b of the first load sensor beam 14 directly to the first side rail 36, and by connecting both end sections 32a,b of the second load sensor beam 16 directly to the second side rail 38. These alternative embodiments in which the load sensor beams 14, 16 are longitudinally oriented would not have the ability to detect when a person is seated near the front edge 62 of the vehicle seat 12, as can be accomplished with the preferred embodiment, and which is discussed below. In another alternative embodiment, one or more of the load sensor beams 14, 16 could be oriented at an oblique angle that is not parallel to the longitudinal or transverse directions. Although not required, preferably the load sensor beams 14, 16 are located in the same horizontal plane.

In a variation of the embodiment shown in FIGS. 1A and 2, one or both of the cross-members 18, 20 need not be included if the structure of the base frame 22 is modified to enable the side rails 36, 38 to remain in position and support the seat 12 without the cross-members 18, 20. In another variation of the embodiment shown in FIGS. 1A and 2, the pins 50a–d could be attached directly to extensions of the side rails (not shown), without being attached to the cross-members 18, 20. In this variation, the cross-members 18, 20 could be used to support the side rails 36, 38, or if the base frame 22 is modified to enable the side rails 36, 38 to remain in position and support the seat 12 without the cross-members 18, 20, then the cross-members 18, 20 would not need to be used. In another variation of the embodiment shown in FIGS. 1A and 2, the end sections 26a,b, 32a,b of one or both of the load sensor beams 14, 16 could be rotatably attached directly to the side rails 36, 38, without including the pins 50a–d. This could be accomplished with hinges (not shown), or with cylindrical members (not shown) extending through corresponding loops (not shown) or holes (not shown) formed in, or attached to, the end sections 26a,b, 32a,b of the load sensor beams 14, 16 and the side rails 36, 38. This could also be accomplished with cylindrical members (not shown) formed in the end sections 26a,b, 32a,b of the load sensor beams 14, 16 oriented transverse to the longitudinal axes of the load sensor beams 14, 16, and that fit inside corresponding bores (not shown), in or attached to, the side rails 36, 38. This could also be accomplished with cylindrical members (not shown) formed in the side rails 36, 38 oriented parallel to the longitudinal axes of the side rails 36, 38, and that fit inside corresponding bores (not shown), in or attached, to corresponding end sections 26a,b, 32a,b of the load sensor beams 14, 16. Some or all of these alternative embodiments could also be combined.

Figure 1B:
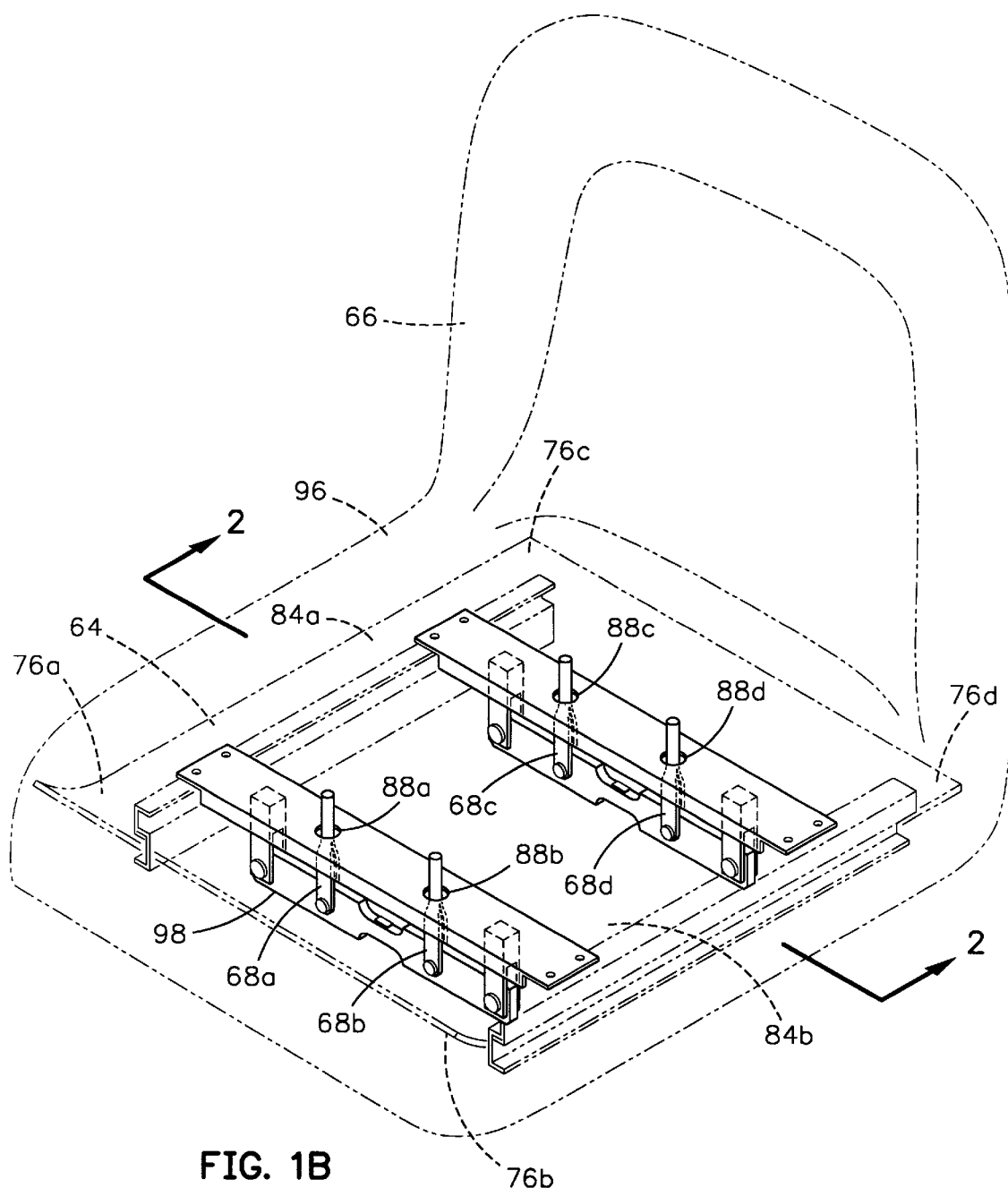
FIG. 1B is a duplicate of the isometric view of FIG. 1A, in which additional reference numbers denote additional aspects of the present invention.

As illustrated in FIG. 1B, a seat pan 64 of the vehicle seat 12 is positioned adjacent the base frame 22 of the vehicle seat 12. Typically, the seat pan 64 is approximately four hundred (400) millimeters wide, and measures approximately four hundred sixty (460) millimeters from front to back, although seat pans 64 of other sizes may also be used. In most instances the seat back 66 is not attached to the seat pan 64, but is attached to the rearward ends of the side rails 36, 38 of the base frame 22 in a fashion providing for adjustment of the angle of recline of the seat back 66. A first post 68a, second post 68b, third post 68c, and fourth post 68d are attached to the seat pan 64 and extend downward from the seat pan 64. One end of post 68a is attached to corner area 76a of the seat pan 64, one end of post 68b is attached to corner area 76b of the seat pan 64, one end of post 68c is attached to corner area 76c of the seat pan 64, and one end of post 68d is attached to corner area 76d of the seat pan. The other end of each of the posts 68a,b is attached to a corresponding end section 26a,b of load sensor beam 14. Similarly, the other end of each of the posts 68c,d is attached to a corresponding end section 32a,b of load sensor beam 16. Consequently, the end sections 26a,b, 32a,b of each load sensor beam 14, 16 are connected to first and second laterally opposite side areas 84a,b of the seat pan 64. Each side area 84a,b of the seat pan 64 is defined as an area or zone generally near an edge of the seat pan 64. Preferably the pair of posts 68a,b, 68c,d attached to each respective load sensor beam 14, 16 are separated by the same distance. As an alternative embodiment, two of the posts 68a,b could be attached to respective forward and rearward opposite side areas of the seat pan 64, and two of the posts 68a–d could be attached to respective laterally opposite side areas 84a,b of the seat pan 64. However, this would require positioning the load sensor beams 14, 16 in a crossed orientation, with one load sensor beam above the other, or would require positioning the load sensor beams 14, 16 in oblique orientations.

The first cross-member 18 has a first hole 88a and a second hole 88b, and the second cross-member 20 has a first hole 88c and a second hole 88d. The holes 88a–d are sized and located so that the first post 68a passes through the first hole 88a, the second post 68b passes through the second hole 88b, the third post 68c passes through the third hole 88c, and the fourth post 68d passes through the fourth hole 88d. The plurality of loads, also referred to as forces, generated by a weight of a person sitting on a seat cushion 96 carried by the seat pan 64 are transmitted to the posts 68a–d. Each post 68a–d transmits one of these loads to a respective one of the end sections 26a,b, 32a,b of the load sensor beams 14, 16. As a result of the loads, the intermediate section 24, 30 of each of the load sensor beams 14, 16 flexes to an extent representative of the loads on the respective load sensor beam 14, 16. In the alternative embodiments described above that use more than two load sensor beams, additional posts could be used to connect one or more additional load sensor beams with the seat pan 64. Alternatively, the forward load sensor beam 14 and the forward pair of posts 68a,b could be eliminated, resulting in a system that could detect when the center of weight of the person seated in the seat 12 is applied forward of a transverse line 98, as discussed below, but that could not detect the weight of the person seated on the seat 12.

As illustrated in FIG. 2, there is a lateral distance 100, typically about forty-eight (48) millimeters, between the centers of the points where each pin 50a–d and each corresponding post 68a–d is attached to a corresponding one of the end sections 26a,b, 32a,b of the load sensor beams 14, 16. Due to these lateral distances 100, when one of the posts 68a–d is pushed downward, or pulled upward, as a result of the weight of a person sitting in the seat 12, a bending moment is generated around the point where the corresponding pin 50a–d is attached to the corresponding end section 26a,b, 32a,b. When one or both of the posts 68a–d attached to a corresponding one of the load sensor beams 14, 16 push downward on the load sensor beam 14, 16, the resulting positive bending moment or moments cause the intermediate section 24, 30 of the corresponding load sensor beam 14, 16 to flex downward. Similarly, if one or both of the posts 68a–d attached to a corresponding one of the load sensor beams 14, 16 are pulled upward, the resulting negative bending moment or moments cause the intermediate section 24, 30 of the corresponding load sensor beam 14, 16 to flex upward.

When a person sits on the seat 12 such that the center of the weight of the person is applied within the substantially rectangular area on the seat defined by the four posts 68a–d, then all of the posts 68a–d push downward and produce positive bending moments. The weight of the person sitting on the seat 12 is determined by detecting the amount that the intermediate sections 24, 30 of the load sensor beams 14, 16 are flexed due to these bending moments. If the person is seated directly over the point central to where the four posts 68a–d are attached to the seat pan 64, which will generally be the center of the seat 12, then the posts 68a–d will produce substantially equal bending moments. If the person is not seated in the center of the seat 12, but is seated such that the center of the weight of the person is applied within the substantially rectangular area on the seat 12 defined by the four posts 68a–d, then the posts will not produce equal bending moments. In this case the weight of the person is still accurately determined because a decreased bending moment generated by one or more of the posts 68*a–d* will be compensated for by an increased bending moment generated by one or more of the other posts 68*a–d*.

If the person is located on the seat 12 such that the center of the weight of the person is applied outside of the substantially rectangular area on the seat defined by the four posts 68*a–d*, then one or more of the posts 68*a–d*, other than the post 68*a–d* closest to the center of weight, can experience a lifting force, which produces a negative bending moment. If the center of weight is applied laterally outside of the rectangular area defined by the four posts 68*a–d*, this can result in a positive bending moment and a negative bending moment being applied to a single load sensor beam 14, 16. In this case the intermediate section 24, 30 of the load sensor beam 14, 16 flexes in a fashion to effectively sum the positive moment, and the generally smaller negative moment, to produce an accurate representation of the applied load. Thus, the system 10 is generally insensitive to where the center of weight is laterally applied on the seat 12. If the person is located on the seat 12 such that the center of weight is applied forward of the posts 68*a,b* outside of the rectangular area, then the weight detected by the system 10 can be less than the actual weight of the person, due to the resulting lifting force on posts 68*c,d* and the consequent negative bending moments applied to the aft load sensor beam 16.

Figure 1C:
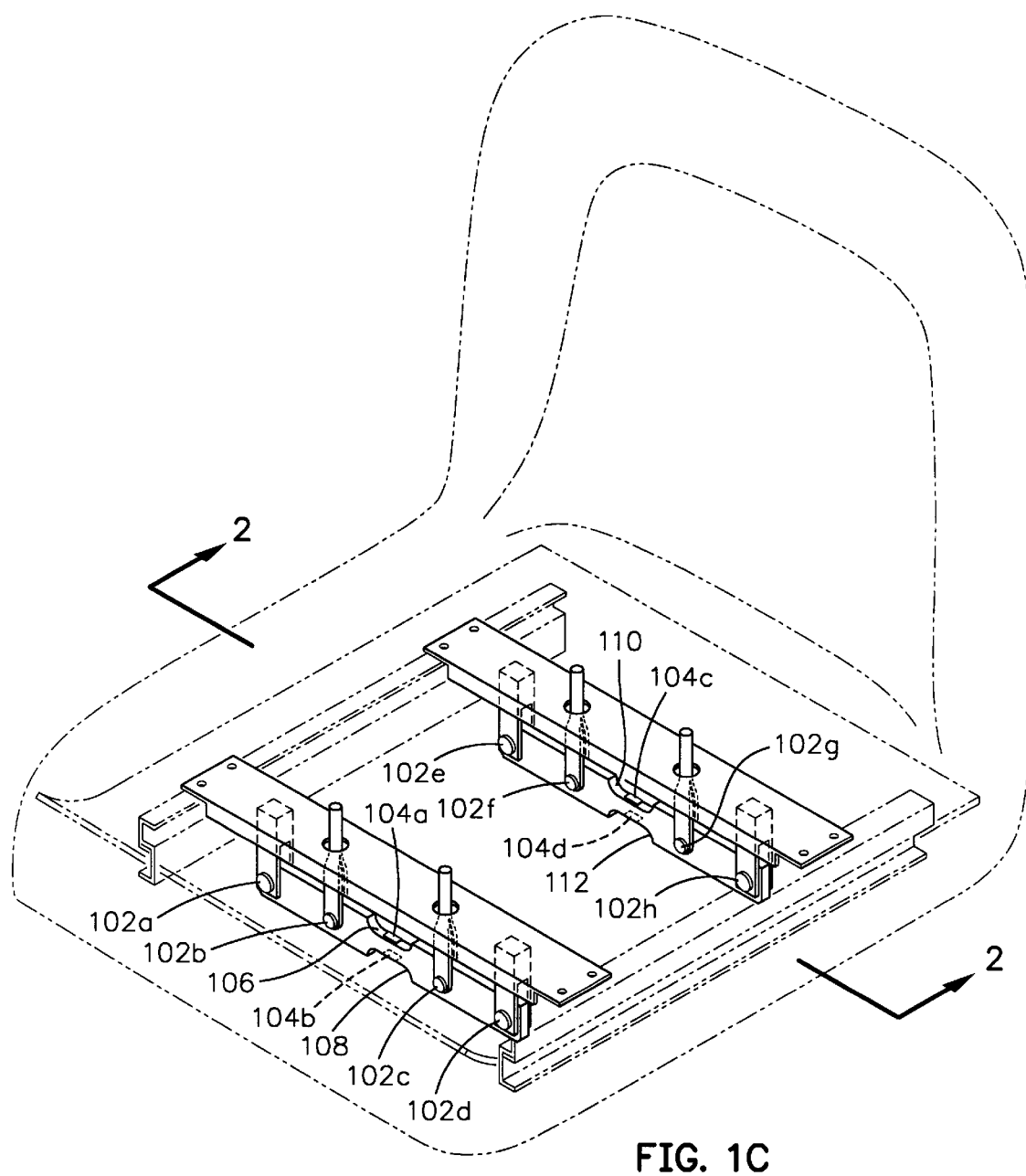
FIG. 1C is another duplicate of the isometric view of FIG. 1A, in which still more reference numbers denote additional aspects of the present invention.

In order to accurately determine the weight of the person seated in the seat 12, the load sensor beams 14, 16 must be allowed to flex unimpededly. To allow the load sensor beams 14, 16 to flex unimpededly, the points where the pins 50*a–d* and posts 68*a–d* attach to the load sensor beams 14, 16 must permit rotation when the posts 68*a–d* push downward, or pull upward, on the load sensor beams 14, 16. This may be accomplished in any way that allows the bending moments to operate freely without creating unwanted reaction points that could cause errors in determining the weight of the person in the seat 12, for example with nylon bushings (not shown) or other bearing material installed around bushing rods 102*a–h* (FIG. 1C). Preferably, the bushings or other bearing materials extend into corresponding holes (not shown) in the load sensor beams 14, 16, the pins 50*a–d*, and the posts 68*a–d*. The bushing rods 102*a–h* extend through the bushings or other bearing materials that are inserted in the holes through the pins 50*a–d*, posts 68*a–d*, and load sensor beams 14, 16. The ends of the bushing rods 102*a–h* are enlarged, to hold the bushing rods 102*a–h* in place. One end of each of the bushing rods 102*a–h* is removable for installation, and is secured to the respective bushing rod 102*a–h* after installation, preferably with threads or a cotter pin. Alternatively, bushing or bearing material may be inserted only in the holes in the load sensor beams 14, 16, or only in the holes in the pins 50*a–d* and posts 68*a–d*, with the holes that do not house bushings or bearing material being made smaller to compensate for the lack of bushings or bearing material.

In order to quantify the amount that the intermediate sections 24, 30 of the load sensor beams 14, 16 flex when a person sits in the seat 12, sensors 104*a–d* (FIG. 1C) are attached to the intermediate sections 24, 30 of the load sensor beams 14, 16 for outputting signals representative of the plurality of loads generated by the weight of the person sitting on the seat cushion 96. Preferably the sensors 104*a–d* are strain gauges, although other types of sensors could be used, for example sensors that measure the vertical displacements of the intermediate sections 24, 30 of the load sensor beams 14, 16.

As illustrated in FIG. 1C, a first sensor 104*a* is affixed to a first side edge 106, also referred to as an upper side edge, of the intermediate section 24 of the forward load sensor beam 14. The first sensor 104*a* is for outputting a first signal representative of a strain on an upper part of the intermediate section 24 of the forward load sensor beam 14. Similarly, a second sensor 104*b* is affixed to a second side edge 108 opposite to and below the first side edge 106. The second side edge 108 is also referred to as a lower side edge of the intermediate section 24 of the forward load sensor beam 14. The second sensor 104*b* is for outputting a second signal representative of a strain on a lower part of the intermediate section 24 of the forward load sensor beam 14. Likewise, a third sensor 104*c* is affixed to an first side edge 110, also referred to as an upper side edge, of the intermediate section 30 of the aft load sensor beam 16 for outputting a third signal representative of a strain on an upper part of the intermediate section 30 of the aft load sensor beam 16. Similarly, a fourth sensor 104*d* is affixed to a second side edge 112 opposite to and below the first side edge 110. The second side edge 112 is also referred to as a lower side edge of the intermediate section 30 of the aft load sensor beam 16. The fourth sensor 104*d* is for outputting a fourth signal representative of a strain on a lower part of the intermediate section 30 of the aft load sensor beam 16.

Figure 5:
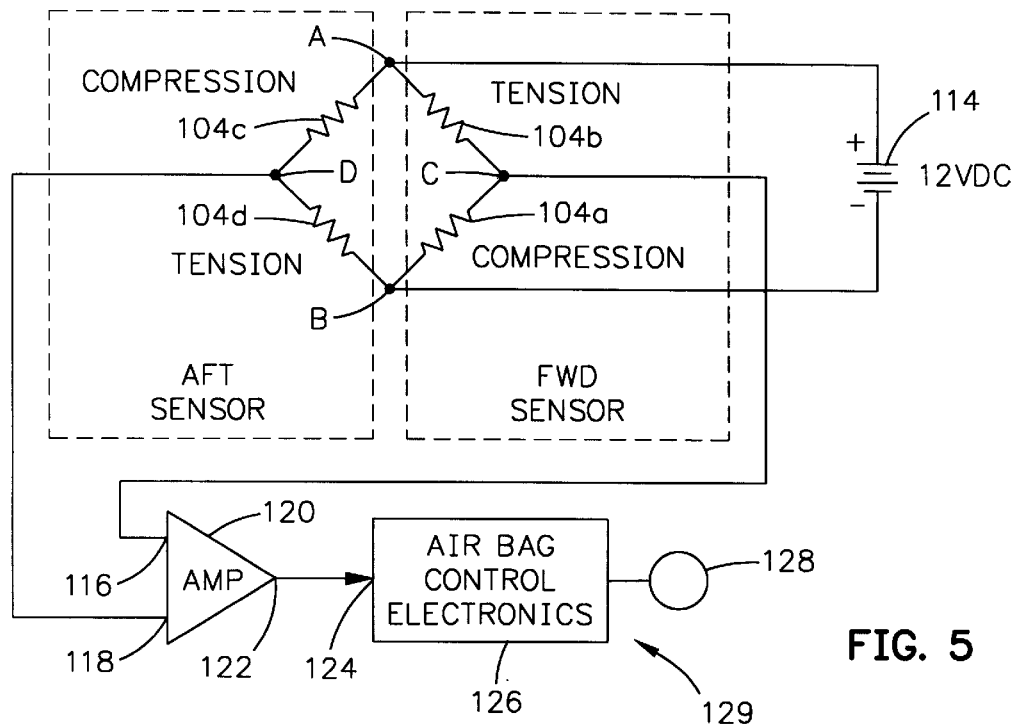
FIG. 5 is a schematic diagram illustrating a circuit for receiving and processing the signals from a plurality of load sensors mounted on the load sensor beams of the system illustrated in FIG. 1.
Figure 6:
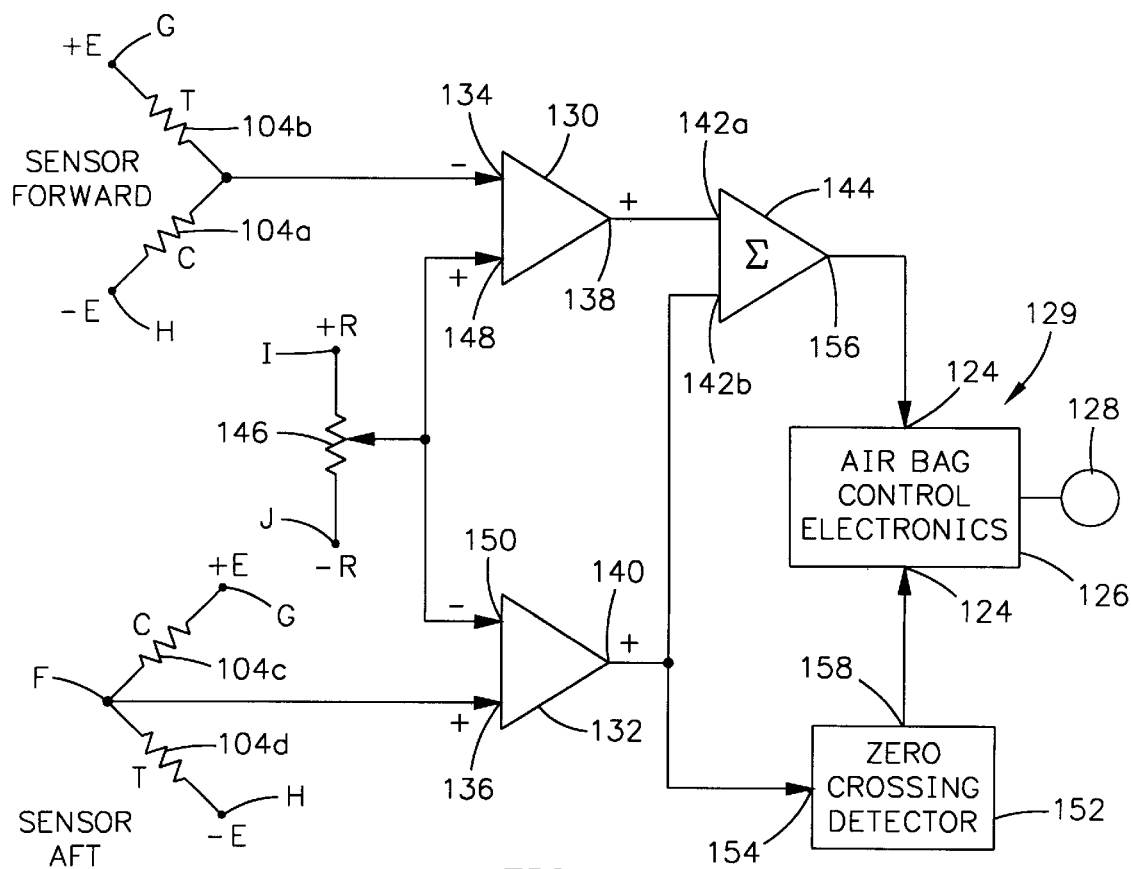
FIG. 6 is a schematic diagram illustrating another circuit for receiving and processing the signals from a plurality of load sensors mounted on the toad sensor beams of the system illustrated in FIG. 1.

Preferably, the strain gauges 104*a–d* are variable resistance electric strain gauges. Each strain gauge 104*a–d* has a pair of electrical leads, which are depicted in FIGS. 5 and 6. The electrical leads are used to connect each strain gauge 104*a–d* in the desired electrical relationship with the other strain gauges 104*a–d* and the other electrical circuitry. The signal outputted from each strain gauge 104*a–d* is the voltage across the respective strain gauge 104*a–d*, which is a function of the resistance of the respective strain gauge 104*a–d*. Resistive strain gauges typically increase in resistance when subjected to tension, and decrease in resistance when subjected to compression. When the intermediate section 24 of the forward load sensor beam 14 is flexed downward, the strain gauge 104*a* affixed to the upper side edge 106 of the intermediate section 24 of the forward load sensor beam 14 is subjected to compression and consequently its resistance decreases. Similarly, when the intermediate section 24 of the forward load sensor beam 14 is flexed downward, the strain gauge 104*b* affixed to the lower side edge 108 of the intermediate section 24 of the forward load sensor beam 14 is subjected to tension and consequently its resistance increases. Likewise, when the intermediate section 30 of the aft load sensor beam 16 is flexed downward, the strain gauge 104*c* affixed to the upper side edge 110 of the intermediate section 30 of the aft load sensor beam 16 is subjected to compression and consequently its resistance decreases. Similarly, when the intermediate section 30 of the aft load sensor beam 16 is flexed downward, the strain gauge 104*d* affixed to the lower side edge 112 of the intermediate section 30 of the aft load sensor beam 16 is subjected to tension and consequently its resistance increases. Conversely, if the intermediate section 24, 30 of one of the load sensor beams 14, 16 is flexed upward rather than downward, the strain gauge 104*a,c* affixed to the upper side edge 106, 110 of the respective intermediate section 24, 30 will be subjected to tension and its resistance will increase, and the strain gauge 104*b,d* affixed to the lower side edge 108, 112 of the respective intermediate section 24, 30 will be subjected to compression and its resistance will decrease. In FIGS. 5 and 6 the sensors 104*a–d* are labeled compression (C) or tension (T), indicating the condition of the respective sensor 104*a–d* when the intermediate sections 24, 30 of the load sensor beams 14, 16 are flexed downward.

As depicted in FIG. 5, the first sensor 104a, second sensor 104b, third sensor 104c and fourth sensor 104d are variable resistance electric strain gauges connected in a Wheatstone bridge configuration. A positive voltage from a battery 114 is applied to node A, and node B is connected to the negative end of the battery 114, which may also be electrical ground. Alternatively, the voltages at nodes A and B can be reversed as long as inputs 116, 118 to a first differential amplifier 120 are also reversed. The voltages applied to nodes A and B, and voltages for powering the other electronic circuitry are preferably obtained from the preexisting vehicle electrical system, which includes the battery 114. If desired, power supply circuitry could be connected to the battery to produce voltages in addition to the voltage of the battery, which could include both positive and negative voltages, for supplying power to the electronic circuitry.

The strain gauges 104a–b attached to the forward load sensor beam 14 are electrically connected to form a voltage divider that outputs a voltage signal at node C that corresponds with the direction and amount that the intermediate section 24 of the forward load sensor beam 14 is flexed. Likewise, the strain gauges 104c–d attached to the aft load sensor beam 16 are electrically connected to form a voltage divider that outputs a voltage signal at node D corresponding to the direction and amount that the intermediate section 30 of the aft load sensor beam 16 is flexed. If the intermediate sections 24, 30 of both load sensor beams 14, 16 are flexed downward, the voltage output at node C from the forward sensor half of the Wheatstone bridge will drop, and the voltage output at node D from the aft sensor half of the Wheatstone bridge will increase, thereby creating a voltage difference between nodes C and D. Nodes C and D are connected respectively to first input 116 and second input 118 of the first differential amplifier 120, which amplifies the voltage difference between nodes C and D. The signal at the output 122 of the first differential amplifier 120 is proportional to the voltage difference between nodes C and D. Thus, the output 122 of the first differential amplifier 120 is representative of the weight of the person sitting on the seat 12, with specific voltage outputs from the first differential amplifier 120 corresponding with specific weights.

The output 122 of the first differential amplifier 120 is connected to an air bag disable input 124 of air bag control electronics 126, or, if required, to an interface circuit (not shown) which is connected to the air bag disable input 124 of the air bag control electronics 126. The signal connected to the disable input 124 is referred to as a control signal. The air bag control electronics 126 control the actuation and disablement of an air bag 128, and are also referred to as an air bag actuation controller. The air bag 128 and the air bag control electronics 126 may together be referred to as an airbag assembly 129. Preferably the air bag control electronics 126 are preexisting in the vehicle. The air bag disable input 124 (which may also be referred to as an air bag enable input) of the air bag control electronics 126 will typically function to disable and prevent actuation of the air bag 128 if the input voltage connected to the air bag disable input 124 is below a threshold amount, or alternatively depending on the design of the air bag control electronics 126, above a threshold amount.

In order to prevent the air bag 128 from injuring babies and small children seated in child seats that may be placed on the vehicle seat 12, or children that may be seated on the vehicle seat 12, the air bag 128 is disabled when the detected weight of the person in the vehicle seat 12 is below a lower weight limit. As stated above, when a child seat is placed on the vehicle seat 12, the detected weight is the weight of the baby or child seated in the child seat, plus the weight of the child seat. Therefore, when there is a child seat on the vehicle seat, the weight of the person seated in the vehicle seat 12 is defined to be the weight of the baby or child seated in the child seat, plus the weight of the child seat. The gain of the first differential amplifier 120, or the level of the output signal from the first differential amplifier 120, is adjusted so that the lower weight limit, for example about one hundred twenty (120) pounds, results in a control voltage that equals the threshold voltage of the air bag control electronics 126. The air bag 128 is thereby disabled when the weight of the person in the seat 12 is below the lower weight limit.

Preferably, the control signal also disables the air bag 128 when the weight of the person on the seat 12 is above an upper weight limit. This can be accomplished with additional circuitry, for example comparators and associated circuitry (not shown), connected to the output 122 of the first differential amplifier 120. Alternatively, the signals at nodes C and D, or the output from the first differential amplifier 120, could be digitized and processed to produce a control signal that disables the air bag 128 when the weight is below the lower weight limit or above the upper weight limit. Deployment of the air bag 128 is disabled above the upper weight limit to prevent the air bag 128 from injuring very large adults, that due to their size would be located very close to the air bag 128. The upper weight limit is a very large amount of weight, for example about three hundred (300) pounds.

In order to accurately control deployment of the air bag 128, the weight of the person seated in the seat 12 is determined by the preferred embodiment of the system 10 with an error of less than plus about five (5) pounds, and less than minus about five (5) pounds. This level of accuracy is achieved with either the electric circuitry illustrated in FIG. 5, or the electric circuitry illustrated in FIG. 6. Implementations having less accuracy could be employed for some applications. Typically, only the weight of the person seated in the front passenger seat is determined and only the air bag in front of the front passenger seat is disabled, although the system and method of the present invention could be used with any of a vehicle's seats and air bags.

FIG. 6 illustrates the preferred embodiment of the circuitry, wherein the outputs of the Wheatstone bridge at nodes E and F are amplified separately. In this embodiment a positive voltage (+E) is applied to node G, and a negative voltage (−E) is applied to node H. Similarly, a positive voltage (+R) is applied to node I, and a negative voltage (−R) is applied to node J. Power supply circuitry (not illustrated) is connected to the vehicle electrical system to produce the (+E), (−E), (+R), and (−R) voltages. Alternatively, rather than being negative voltages, the (−E) and (−R) voltages could be electrical ground. In another alternative embodiment, voltage (+E) could be equal to voltage (+R), and voltage (−E) could be equal to voltage (−R). In another alternative embodiment, the (+E) and (−E) voltages could be reversed, which would also require reversal of the inputs to the second differential amplifier 130, and reversal of the inputs to the third differential amplifier 132. In still another alternative embodiment, the (+R) and (−R) voltages could be reversed, with or without also reversing the (+E) and (−E) voltages.

In the preferred embodiment illustrated in FIG. 6, the output signal from the forward sensor half of the Wheatstone bridge, at node E, is connected to the inverting input 134 of the second differential amplifier 130, and the output signal from the aft sensor half of the Wheatstone bridge, at node F, is connected to the noninverting input 136 of the third differential amplifier 132. The output 138 of the second differential amplifier 130, and the output 140 of the third differential amplifier 132, are connected to the inputs 142a–b of a summing amplifier 144, which adds the output signals together. A calibration potentiometer 146 is used to set a reference voltage that is connected to the noninverting input 148 of the second differential amplifier 130, and to the inverting input 150 of the third differential amplifier 132.

In the embodiment illustrated in FIG. 6, the signals from the forward and aft sensor halves of the Wheatstone bridge are amplified separately so that the signal outputted from the aft sensor half of the Wheatstone bridge at node F can be amplified and then connected to a zero crossing detector 152. The output 140 of the third differential amplifier 132 is connected to the input 154 of the zero crossing detector 152. The zero crossing detector 152 detects when a voltage less than a predetermined voltage is present at the output 140 of the third differential amplifier 132. The predetermined voltage may be zero, and is a function of the power supply voltages for the electronic circuitry. The output signal from the third differential amplifier 132 becomes less than the predetermined voltage when the posts 68c,d attached to the aft load sensor beam 16 pull in an upward direction on the aft load sensor beam 16, causing a decrease in the voltage at node F. The aft load sensor beam 16 will be pulled in an upward direction if the center of weight of the person seated on the seat 12 is applied forward of the predetermined transverse line 98 (FIG. 1B), which is generally coincident with the location of the forward load sensor beam 14. When the center of weight of the person is applied forward of the forward load sensor beam 14, an overturning moment is created which causes the aft portion of the seat pan 64 to be pulled in an upward direction. This overturning moment typically will be caused by a child or adult sitting near the front edge 62 of the seat 12. When the zero crossing detector 152 detects a voltage less than the predetermined voltage at the output 140 of the third differential amplifier 132, the zero crossing detector 152 outputs a signal to disable the air bag 128, for example, a voltage below the threshold voltage of the air bag disable input 124 of the existing air bag control electronics 126. The air bag 128 is disabled when a child or adult is seated near the front edge 62 of the seat 12, because a person seated in that location would be very close to the air bag 128, and could be injured by the air bag 128.

The output 156 of the summing amplifier 144 outputs a voltage proportional to the weight of the person seated on the seat 12, to prevent deployment of the air bag 128 when the weight detected is below the lower weight limit. Preferably, the output 156 of the summing amplifier 144 is connected to additional circuitry (not illustrated) that outputs a signal to prevent deployment of the airbag 128 when the weight detected is above the upper weight limit. The output 158 of the zero crossing detector 152 and the output 156 of the summing amplifier 144 are connected to one or more air bag disable inputs 124 of the air bag control electronics 126, or if required, to an interface circuit (not shown) connected to one or more air bag disable inputs 124 of the air bag electronics 126. Both the signal from the output 156 of the summing amplifier 144 and the signal from the output 158 of the zero crossing detector 152 are control signals that will independently prevent deployment of the air bag 128. Thus, even if the total weight detected is greater than the lower weight limit and less than the upper weight limit, deployment of the air bag 128 will be prevented if the zero crossing detector 152 determines that a negative load is present at the aft load sensor beam 16.

Some vehicle air bag systems have two different deployment stages, a first stage and a second stage, with the first stage being larger than the second stage. The present invention can be used with such two stage air bag systems. If the disable input 124 (FIG. 5), or one of the disable inputs (FIG. 6), of the air bag control electronics 126 controls the two deployment stages based on the voltage applied to the disable input, then the voltage at the output 122 of the first differential amplifier 120, or the voltage at the output 156 of the summing amplifier 144, would be connected directly to the disable input 124. This voltage, which is proportional to the weight of the person seated in the vehicle seat 12, would be calibrated to correspond to the threshold voltages for the two deployment stages. Alternatively, the output 122 of the first differential amplifier 120, or the output 156 of the summing amplifier 144, could be connected to interface circuitry (not illustrated) that produces the proper output voltages to be applied to the disable input 124 of the air bag control electronics 126 to trigger the first and second deployment stages. Alternatively, if the air bag control electronics 126 has separate disable inputs for the two deployment stages, interface circuitry would be used that produces separate output signals for connection to the separate disable inputs.

Figure 3:
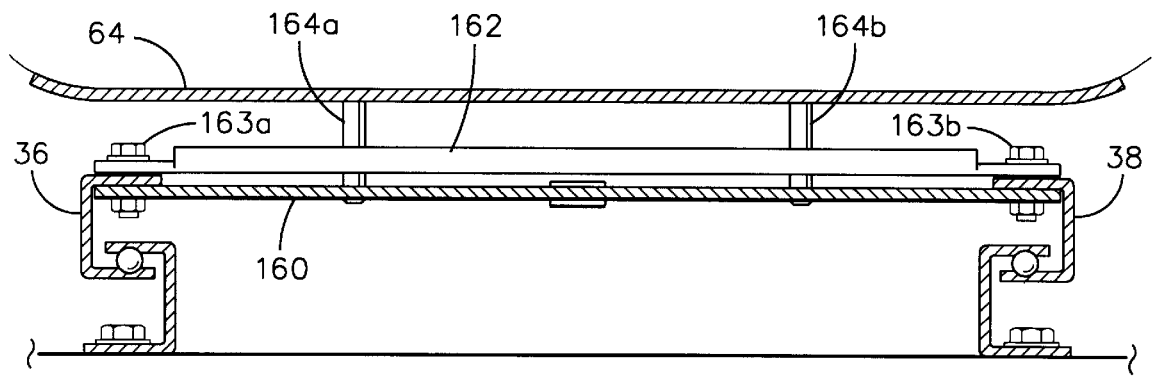
FIG. 3 is an enlarged cross sectional view similar to FIG. 2 of a seat equipped with a weight detection system similar to the system illustrated in FIG. 1, wherein the load sensor beams have a different configuration and orientation.

In an alternative embodiment illustrated in FIG. 3, a first load sensor beam (not shown), and a second load sensor beam 160 are attached directly to the first side rail 36 and the second side rail 38. Because the load sensor beams are attached directly to the rails 36, 38, no pins 50a–d are used to connect the load sensor beams with the base frame 22. The first and second load sensor beams in this alternative embodiment are rotated 90 degrees compared with the orientation of the load sensor beams 14, 16 illustrated in the embodiment of FIGS. 1A–C and 2. In this alternative embodiment the first load sensor beam (not shown) is located beneath a first cross-member (not shown), and the second load sensor beam 160 is located beneath a second cross-member 162. The cross-members 162 are positioned in generally the same locations along the side rails 36, 38 of the base frame 22 as the cross-members 18, 20 in the embodiment shown in FIGS. 1A–C and 2. One end of each cross-member 162 is attached to the first side rail 36, and the opposite end of each cross-member 162 is attached to the second side rail 38. In the embodiment illustrated in FIG. 3, nuts and bolts 163a,b are used to fasten the cross-members 162 to the first side rail 36 and the second side rail 38. However, any fasteners could be used, for example rivets, screws, or cotter pins, or, the cross-members 162 could be directly bonded to the side rails 36, 38, for example by welding. As illustrated in FIG. 3, nuts and bolts 163a,b are also used to attach the load sensor beams 160 to the side rails 36, 38. Alternatively, the load sensor beams 160 could be attached to the side rails 36, 38 with any of the methods discussed above for attaching the cross-members 162 to the side rails 36, 38, or with any of the methods discussed above for attaching the load sensor beams 14, 16 to the side rails 36, 38.

Unlike the embodiment illustrated in FIGS. 1A–C and 2, in the embodiment illustrated in FIG. 3, the first post (not shown), second post (not shown), third post 164a, and fourth post 164b are attached directly to the upward facing sides of the load sensor beams 160. Also, unlike the embodiment shown in FIGS. 1A–C and 2, in the embodiment illustrated in FIG. 3 the posts 164a,b are attached to the load sensor beams 160 in a manner that does not allow for rotation. In a variation of the alternative embodiment of FIG. 3, the posts 164a,b could be attached to the load sensor beams in a manner that allows for rotational movement of the load sensor beams relative to the posts 164a,b. For example, this could be accomplished with cylindrical members (not shown) oriented perpendicular to the longitudinal axes of the load sensor beams 160 that are either attached to, or integral with, the load sensor beams 160, and that fit through corresponding holes (not shown) formed in the ends of the posts 164a,b.

Figure 4:
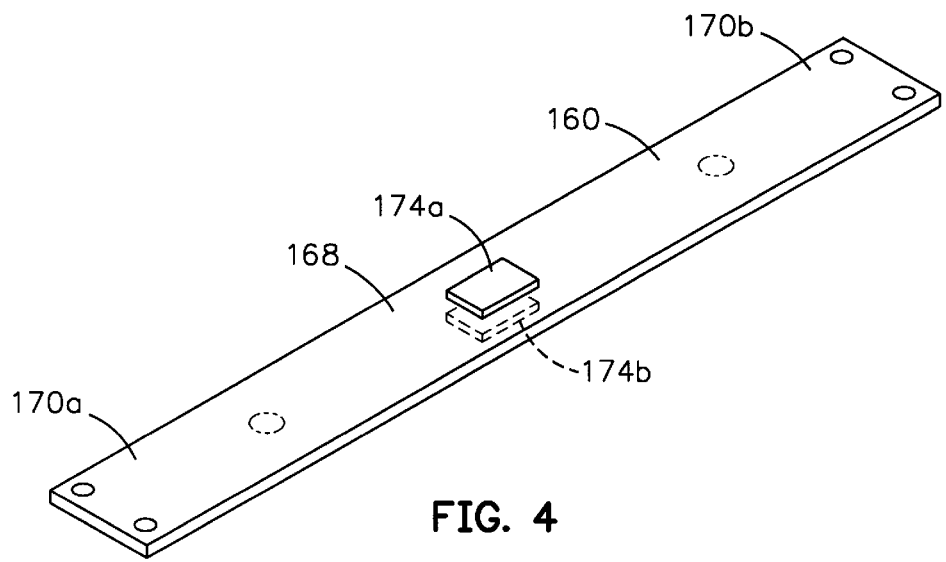
FIG. 4 is an enlarged isometric view of one of the load sensor beams of the alternative embodiment of FIG. 3.

FIG. 4 illustrates a load sensor beam 160 that is representative of the load sensor beams 160 used in the embodiment of FIG. 3. Unlike the load sensor beams 14, 16 in the embodiment illustrated in FIGS. 1A–C and 2, the intermediate section 168 of the load sensor beam 160 illustrated in FIG. 4 does not have a smaller cross sectional area than the opposite end sections 170a,b of the load sensor beam 160. In a variation of this alternative embodiment, the thickness and/or the width of the load sensor beams 160 could be varied to focus the stresses on the intermediate sections 168 of the load sensor beams 160. In the alternative embodiment of FIG. 3, a first sensor (not shown) is attached to the upward facing side of the first load sensor beam (not shown), and a second sensor (not shown) is attached to the downward facing side of the first load sensor beam. Similarly, a third sensor 174a is attached to the upward facing side of the second load sensor beam 160, and a fourth sensor 174b is attached to the downward facing side of the second load sensor beam 160.

In a variation of the alternative embodiment shown in FIG. 3, one or both of the cross-members need not be included if the structure of the base frame 22 is modified to enable the side rails 36, 38 to remain in position and support the seat 12 without the cross-members. In other variations of the alternative embodiment shown in FIG. 3, the end sections 170a,b of the load sensor beams 160 could be rotatably attached directly to the side rails 36, 38, for example with hinges (not shown), or with cylindrical members (not shown) extending through corresponding loops (not shown) or holes (not shown). For example, this could be accomplished with cylindrical members (not shown) formed in the ends of the load sensor beams 160 oriented transverse to the longitudinal axes of the load sensor beams 160, and that fit inside corresponding bores (not shown), in or attached to, the side rails 36, 38. This could also be accomplished with cylindrical members (not shown) formed in the side rails 36, 38 oriented parallel to the longitudinal axis of the side rails 36, 38, and that fit inside corresponding bores (not shown), in or attached to corresponding end sections 170a,b of the load sensor beams 160.

While I have described a preferred embodiment and some alternative embodiments of my system and method for determining the weight of a person in a seat in a vehicle, it will be understood by those skilled in the art that my invention may be modified in both arrangement and detail. Therefore, the protection afforded my invention should only be limited in accordance with the scope of the following claims.

What is claimed is:

1. A system for detecting the weight of a person seated in a vehicle seat, comprising:

a pair of load sensor beams, each having an intermediate section extending between a pair of opposite end sections;

first means for connecting the opposite end sections of the load sensor beams to a base frame of a vehicle seat;

second means for connecting the load sensor beams to a seat pan of the vehicle seat positioned above the base frame, the load sensor beams having their end sections connected to opposite sides of the seat pan so that a plurality of loads generated by a weight of a person sitting on a seat cushion carried by the seat pan are transmitted to the intermediate sections of the load sensor beams; and at least one sensor mounted on each of the intermediate sections of the load sensor beams for outputting signals representative of the plurality of loads generated by the weight of the person sitting on the seat cushion.

2. The system of claim 1 wherein the base frame of the vehicle seat has a pair of spaced apart side rails that extend in a longitudinal direction, the load sensor beams extend in a transverse direction, and the first connecting means connects the opposite end sections of the load sensor beams to the side rails of the base frame.

3. The system of claim 2 wherein the first connecting means includes a pair of cross-members extending in the transverse direction and having opposite ends secured to corresponding ones of the side rails of the base frame.

4. The system of claim 1 wherein a first one of the load sensor beams is positioned on a forward side of the base frame and a second one of the load sensor beams is positioned on a rearward side of the base frame.

5. The system of claim 4 and further comprising means connected to at least one sensor mounted on the load sensor beam positioned on the rearward side of the base frame for processing the signals generated by at least one of the sensors mounted on the load sensor beam positioned on the rearward side of the base frame to determine when the center of weight of the person sitting on the seat cushion is forward of a predetermined transverse line and for outputting a control signal that indicates when the center of weight of the person sitting on the seat cushion is forward of the predetermined transverse line.

6. The system of claim 1 wherein the intermediate section of each load sensor beam has a first cross-sectional area that is less than a second cross-sectional area of the opposite end sections.

7. The system of claim 1 wherein each load sensor beam is formed of a generally planar piece of metal, and the intermediate section of each load sensor beam has a first cross-sectional area that is less than a second cross-sectional area of the opposite end sections.

8. The system of claim 7 wherein each load sensor beam has a first sensor affixed to a first side edge of the intermediate section and a second sensor affixed to a second opposite side edge of the intermediate section.

9. The system of claim 8 wherein the first side edge of the intermediate section of each load sensor beam is positioned above the second side edge of the intermediate section of the same load sensor beam.

10. The system of claim 1 wherein the second connecting means includes four posts each extending from a corresponding corner area of the seat pan for transmitting one of the plurality of loads generated by a weight of a person sitting on the seat cushion carried by the seat pan to a corresponding one of the end sections of the load sensor beams.

11. The system of claim 1 wherein the load sensor beams are spaced apart and extend substantially parallel to each other.

12. The system of claim 1 and further comprising means connected to the sensors for processing the signals generated by the sensors to determine the weight of the person sitting on the seat cushion and for outputting a control signal representative of the determined weight.

13. The system according to claim 12 wherein the means for processing the signals generated by the sensors to determine the weight of the person sitting on the seat cushion determines the weight of the person with an error of less than about five pounds.

14. The system according to claim 1 and further comprising means connected to the sensors for processing the signals generated by the sensors to determine the weight of the person sitting on the seat cushion and for outputting a control signal that indicates when the weight of the person is below a lower weight limit to prevent actuation of an air bag when the weight of the person is below the lower weight limit.

15. The system according to claim 14 wherein the lower weight limit is about 120 pounds.

16. The system according to claim 1 and further comprising means connected to the sensors for processing the signals generated by the sensors to determine the weight of the person sitting on the seat cushion and for outputting a control signal that indicates when the weight of the person is above an upper weight limit to prevent actuation of an air bag when the weight of the person is above the upper weight limit.

17. The system of claim 1 wherein the sensors are strain gauges.

18. The system of claim 1 wherein the base frame of the vehicle seat has a pair of spaced apart side rails that extend in a longitudinal direction, the load sensor beams extend in a transverse direction, and the first connecting means includes a pair of cross-members extending in the transverse direction and connecting the opposite end sections of the load sensor beams to the side rails of the base frame.

19. The system of claim 18 wherein the second connecting means includes four posts each extending from a corresponding corner area of the seat pan for transmitting one of the plurality of loads generated by a weight of a person sitting on the seat cushion carried by the seat pan to a corresponding one of the end sections of the load sensor beams.

20. The system of claim 19 wherein the posts extend through corresponding holes in the cross-members.

21. The system of claim 1 wherein a first sensor is affixed to a first side edge of the intermediate section of a first one of the load sensor beams, a second sensor is affixed to a second opposite side edge of the intermediate section of the first load sensor beam, a third sensor is affixed to a first side edge of the intermediate section of a second one of the load sensor beams, a fourth sensor is affixed to a second opposite side edge of the intermediate section of the second load sensor beam, and the first, second, third and fourth sensors are electrically connected in a Wheatstone bridge configuration.

22. The system of claim 1 wherein each of the load sensor beams has a first sensor affixed to an upper side edge of the intermediate section and a second sensor affixed to a lower side edge of the intermediate section.

23. The system of claim 1 wherein each load sensor beam is formed of a generally planar piece of metal, the intermediate section of each load sensor beam has a first cross-sectional area that is less than a second cross-sectional area of the opposite end sections, and a first strain gauge is affixed to a first side edge of the intermediate section and a second strain gauge is affixed to a second opposite side edge of the intermediate section.

24. The system of claim 1 wherein the base frame of the vehicle seat has a pair of spaced apart side rails that extend in a longitudinal direction, the load sensor beams extend in a transverse direction, and the first connecting means includes a pair of cross-members extending in the transverse direction and having opposite ends secured to corresponding ones of the rails and four pins each connecting a corresponding opposite end section of one of the load sensor beams to a corresponding one of the cross-members.

25. A system for detecting the weight of a person seated in a vehicle seat, comprising:

a pair of load sensor beams spaced apart from each other, each having an intermediate section extending between a pair of opposite end sections;

first means for connecting the opposite end sections of the load sensor beams to a base frame of a vehicle seat, the first connecting means including a pair of cross-members extending in the transverse direction and having opposite ends secured to the base frame;

second means for connecting the load sensor beams to a seat pan of the vehicle seat positioned above the base frame, the load sensor beams having their end sections connected to opposite sides of the seat pan so that a plurality of loads generated by a weight of a person sitting on a seat cushion carried by the seat pan are transmitted to the intermediate sections of the load sensor beams;

at least one sensor mounted on each of the intermediate sections of the load sensor beams for outputting signals representative of the plurality of loads generated by the weight of the person sitting on the seat cushion; and means connected to the sensors for processing the signals generated by the sensors to determine the weight of the person sitting on the seat cushion and for outputting a control signal representative of the determined weight.

26. A system for detecting the weight of a person seated in a vehicle seat, comprising:

a pair of load sensor beams each having an intermediate section extending between a pair of opposite end sections, the intermediate section of each load sensor beam having a first cross-sectional area that is less than a second cross-sectional area of the opposite end sections;

first means for connecting the opposite end sections of the load sensor beams to a base frame of a vehicle seat, the load sensor beams being spaced apart and extending substantially parallel to each other in a transverse direction, the base frame of the vehicle seat having a pair of spaced apart side rails that extend in a longitudinal direction, the first means connecting the opposite end sections of the load sensor beams to the side rails of the base frame, a first one of the load sensor beams being positioned on a forward side of the base frame and a second one of the load sensor beams being positioned on a rearward side of the base frame, the first means including a pair of cross-members extending in the transverse direction and having opposite ends secured to corresponding ones of the rails and four pins each connecting a corresponding opposite end section of one of the load sensor beams to a corresponding one of the cross-members;

second means for connecting the load sensor beams to a seat pan of the vehicle seat positioned adjacent the base frame, the load sensor beams having their end sections connected to opposite sides of the seat pan so that a plurality of loads generated by a weight of a person sitting on a seat cushion carried by the seat pan are transmitted to the intermediate sections of the load sensor beams, the second means for connecting including four posts each extending from a corresponding corner area of the seat pan for transmitting one of the plurality of loads to a corresponding one of the end sections of the load sensor beams;

a first sensor affixed to an upper side edge of the intermediate section of a first one of the load sensor beams for outputting a first signal representative of a strain on an upper part of the intermediate section of the first load sensor beam;

a second sensor affixed to a lower side edge of the intermediate section of the first load sensor beam for outputting a second signal representative of a strain on a lower part of the intermediate section of the first load sensor beam;

a third sensor affixed to an upper side edge of the intermediate section of a second one of the load sensor beams for outputting a third signal representative of a strain on an upper part of the intermediate section of the second load sensor beam;

a fourth sensor affixed to a lower side edge of the intermediate section of the second load sensor beam for outputting a fourth signal representative of a strain on a lower part of the intermediate section of the second load sensor beam; and means for electrically connecting the first, second, third and fourth sensors in a Wheatstone bridge configuration for outputting a combination of the first, second, third and fourth signals representative of the plurality of loads generated by the weight of the person sitting on the seat cushion.

27. A vehicle air bag system, comprising:

a pair of load sensor beams, each having an intermediate section extending between a pair of opposite end sections;

first means for connecting the opposite end sections of the load sensor beams to a base frame of a vehicle seat;

second means for connecting the load sensor beams to a seat pan of the vehicle seat positioned adjacent the base frame, the load sensor beams having their end sections connected to opposite sides of the seat pan so that a plurality of loads generated by a weight of a person sitting on a seat cushion carried by the seat pan are transmitted to the intermediate sections of the load sensor beams;

at least one sensor mounted on each of the intermediate sections of the load sensor beams for outputting signals representative of the plurality of loads generated by the weight of the person sitting on the seat cushion;

an air bag assembly including an air bag and an air bag actuation controller; and means connected to the sensors for processing the signals generated by the sensors to determine the weight of the person sitting on the seat and for outputting a control signal that indicates when the weight of the person is below a lower weight limit, the control signal being connected to the air bag actuation controller to prevent actuation of the air bag when the weight of the person is below the lower weight limit.

28. The system of claim 27 wherein the control signal further indicates when the weight of the person is above an upper weight limit, the control signal being connected to the air bag actuation controller to prevent actuation of the air bag when the weight of the person is above the upper weight limit.

29. The system of claim 27 wherein a first one of the load sensor beams is positioned on a forward side of the base frame and a second one of the load sensor beams is positioned on a rearward side of the base frame, and further comprising means connected to at least one sensor mounted on the load sensor beam positioned on the rearward side of the base frame for processing the signals generated by at least one of the sensors mounted on the load sensor beam positioned on the rearward side of the base frame to determine when the center of weight of the person sitting on the seat cushion is forward of a predetermined transverse line and for outputting a control signal that indicates when the center of weight of the person sitting on the seat cushion is forward of the predetermined transverse line.

30. A system for determining when the center of weight of a person sitting on a vehicle seat is forward of a predetermined transverse line, comprising:

a load sensor beam having an intermediate section extending between a pair of opposite end sections;

first means for connecting the opposite end sections of the load sensor beam to a base frame of a vehicle seat;

second means for connecting the load sensor beam to a seat pan of the vehicle seat positioned above the base frame to permit loads from the seat pan to be transmitted to the base frame through the intermediate sections of the load sensor beam;

at least one sensor mounted on the intermediate section of the load sensor beam for outputting signals representative of forces generated by the weight of the person sitting on the seat; and means for processing the signals generated by at least one of the sensors to determine when the center of weight of the person sitting on the seat is forward of a predetermined transverse line and for outputting a control signal that indicates when the center of weight of the person sitting on the seat is forward of the predetermined transverse line.

\* \* \* \* \*